(12) United States Patent
Dadhich et al.

(10) Patent No.: US 12,307,877 B2
(45) Date of Patent: May 20, 2025

(54) METHOD AND ELECTRONIC DEVICE FOR GENERATING ACTIVITY REMINDER IN IoT ENVIRONMENT

(71) Applicant: Samsung Electronics Co., Ltd., Suwon-si (KR)

(72) Inventors: Rahul Dadhich, Bangalore (IN); Karthik Venkatesh Bhat, Bangalore (IN); Varinder Pratap Singh, Bangalore (IN); Alka Sethi, Bangalore (IN); Aditya Aswani, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/978,517

(22) Filed: Nov. 1, 2022

(65) Prior Publication Data

US 2023/0141300 A1    May 11, 2023

Related U.S. Application Data

(63) Continuation of application No. PCT/KR2022/007974, filed on Jun. 7, 2022.

(30) Foreign Application Priority Data

Nov. 10, 2021   (IN) .............................. 202141051415

(51) Int. Cl.
*H04L 67/12*   (2022.01)
*G08B 21/24*   (2006.01)
(Continued)

(52) U.S. Cl.
CPC .............. *G08B 21/24* (2013.01); *H04L 67/12* (2013.01); *G16Y 10/80* (2020.01); *G16Y 40/10* (2020.01)

(58) Field of Classification Search
CPC ........ G08B 21/24; G16Y 10/80; G16Y 40/10; H04L 67/12

See application file for complete search history.

(56) References Cited

U.S. PATENT DOCUMENTS 10,096,227 B2 *  10/2018  Hwang ................. G01J 1/0219
10,157,088 B2    12/2018  Plotkin
(Continued)

FOREIGN PATENT DOCUMENTS

KR    10-1645089 B1    8/2016
KR    10-1728052 B1    5/2017
(Continued)

OTHER PUBLICATIONS

E. Corona, A. Pumarola, G. Alenyà and F. Moreno-Noguer, "Context-Aware Human Motion Prediction," 2020 IEEE/CVF Conference on Computer Vision and Pattern Recognition (CVPR), Seattle, WA, USA, 2020, pp. 6990-6999, doi: 10.1109/CVPR42600.2020.00702. (Year: 2020).*

(Continued)

*Primary Examiner* — Jason D Recek
(74) *Attorney, Agent, or Firm* — Jefferson IP Law, LLP

(57) ABSTRACT

A method and an electronic device for generating activity reminder in Internet of Things (IoT) environment are provided. The method includes identifying movement of user towards an object in the IoT environment, predicting first intended activity of the user, associated with the object based on one or more factors, determining occurrence of one or more interrupts before performing the first intended activity, detecting movement of the user away from the object subsequent to the occurrence of the one or more interrupts and before performing the first intended activity, and generating activity reminder to the user, indicating to perform (Continued)

the first intended activity when the user does not move towards the object for a pre-determined time period.

20 Claims, 8 Drawing Sheets

(51) Int. Cl.
    *G16Y 10/80*      (2020.01)
    *G16Y 40/10*      (2020.01)

(56) References Cited

U.S. PATENT DOCUMENTS

| | | |
|---|---|---|
| 10,616,726 B1* | 4/2020 | Freeman, II ............ H04W 8/02 |
| 10,645,534 B1* | 5/2020 | Klinkner ............... H04W 4/029 |
| 2015/0067699 A1 | 3/2015 | Plotkin |
| 2015/0185713 A1 | 7/2015 | Glickfield et al. |
| 2015/0269834 A1 | 9/2015 | Chae et al. |
| 2016/0349953 A1 | 12/2016 | Adler et al. |
| 2018/0108243 A1* | 4/2018 | Scherer ................. H04W 4/02 |
| 2018/0367329 A1 | 12/2018 | Shin |
| 2019/0088103 A1* | 3/2019 | Lebron .............. G08B 21/0277 |
| 2019/0335290 A1* | 10/2019 | Laaksonen ........... G02B 27/017 |
| 2021/0295833 A1* | 9/2021 | Rastrow .............. G10L 15/1815 |
| 2022/0205803 A1* | 6/2022 | Karunianto ............ G06V 20/56 |

FOREIGN PATENT DOCUMENTS

| | | |
|---|---|---|
| KR | 10-2020-0006961 A | 1/2020 |
| WO | 2020/249190 A1 | 12/2020 |

OTHER PUBLICATIONS

L. Bruckschen, N. Dengler and M. Bennewitz, "Human Motion Prediction Based on Object Interactions," 2019 European Conference on Mobile Robots (ECMR), Prague, Czech Republic, 2019, pp. 1-6, doi: 10.1109/ECMR.2019.8870963. (Year: 2019).*

Chaminda et al., A Smart Reminder System for Complex Human Activities, Jan. 1, 2012.

Klavestad et al., Monitoring Activities of Daily Living Using UWB Radar Technology: A Contactless Approach, Oct. 30, 2020.

Indian Office Action dated Feb. 5, 2024, issued in Indian Application No. 202141051415.

European Search Report dated Oct. 21, 2024, issued in European Application No. 22892966.7.

* cited by examiner

METHOD AND ELECTRONIC DEVICE FOR GENERATING ACTIVITY REMINDER IN IoT ENVIRONMENT

CROSS-REFERENCE TO RELATED APPLICATION(S)

This application is a continuation application, claiming priority under § 365(c), of an International application No. PCT/KR2022/007974, filed on Jun. 7, 2022, which is based on and claims the benefit of an Indian patent application number 202141051415, filed on Nov. 10, 2021, in the Indian Intellectual Property Office, the disclosure of which is incorporated by reference herein in its entirety.

TECHNICAL FIELD

The disclosure relates to the field of Internet of things (IoT). More particularly, the disclosure relates to a method and a reminder generation IoT device for generating activity reminder in the IoT environment.

BACKGROUND

Internet of things (IoT) refers to a network of devices that are connected to one another via the Internet. An IoT environment comprises multiple objects including IoT devices, non-IoT devices, and the like. These objects are a part of a routine of a user. The user uses the objects to perform various activities. For example, the IoT environment is a smart home including the objects, such as, smart Televisions (TVs), coffee maker, mobile phone, iron, and the like. It is most likely that the user occasionally experiences a memory loss or notion regarding an intended activity of the user, especially when the intended activity is interrupted by another important or urgent activity. For example, the user may want to switch off the iron. However, the user may be interrupted by ringing of a doorbell. In such case, it may be likely that the user may miss performing the intended activity i.e., switching off the iron. This loss of track of activities may cause major problems in daily life.

There are some systems of the related art for reminding the user to perform the activities. These systems of the related art include calendar reminder systems, To-do list systems, and other monitoring systems. In these systems of the related art, the user has to pre-log the activities, such as provide a to-do list to get the reminders to perform the activities. In some other systems of the related art, the user has to manually set the reminders for reminding to perform certain activities. In addition, these reminders are not dynamic in nature. In addition, the systems of the related art are limited to IoT activities and do not consider non-IoT activities. Further, in the systems of the related art, the reminders for the activities are limited to pre-logged activities. These systems do not remind the user to perform any activities other than the pre-logged activities.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a reminder generation IoT device for generating activity reminder in the IoT environment.

Additional aspects will be set forth in part in the description which follows and, in part, will be apparent from the description, or may be learned by practice of the presented embodiments.

In accordance with an aspect of the disclosure, a method for generating an activity reminder by an electronic device in an Internet of things (IoT) environment is provided. The method includes identifying a movement of a user towards an object in the IoT environment, predicting a first intended activity of the user, associated with the object, based on one or more factors, determining an occurrence of one or more interrupts in the IoT environment before performing the first intended activity associated with the object, detecting the movement of the user away from the object subsequent to the occurrence of the one or more interrupts and before performing the first intended activity, and generating an activity reminder to the user, indicating to perform the first intended activity when the user does not move towards the object for a pre-determined time period.

In accordance with another aspect of the disclosure, an electronic device for generating an activity reminder in an IoT environment is provided. The reminder generation IoT device includes one or more processors and a memory. The one or more processors are configured to identify a movement of a user towards an object in the IoT environment, predict a first intended activity of the user, associated with the object, based on one or more factors, determine an occurrence of one or more interrupts in the IoT environment before performing the first intended activity associated with the object, detect the movement of the user away from the object subsequent to the occurrence of the one or more interrupts and before performing the first intended activity, and generate an activity reminder to the user, indicating to perform the first intended activity when the user does not move towards the object for a pre-determined time period.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
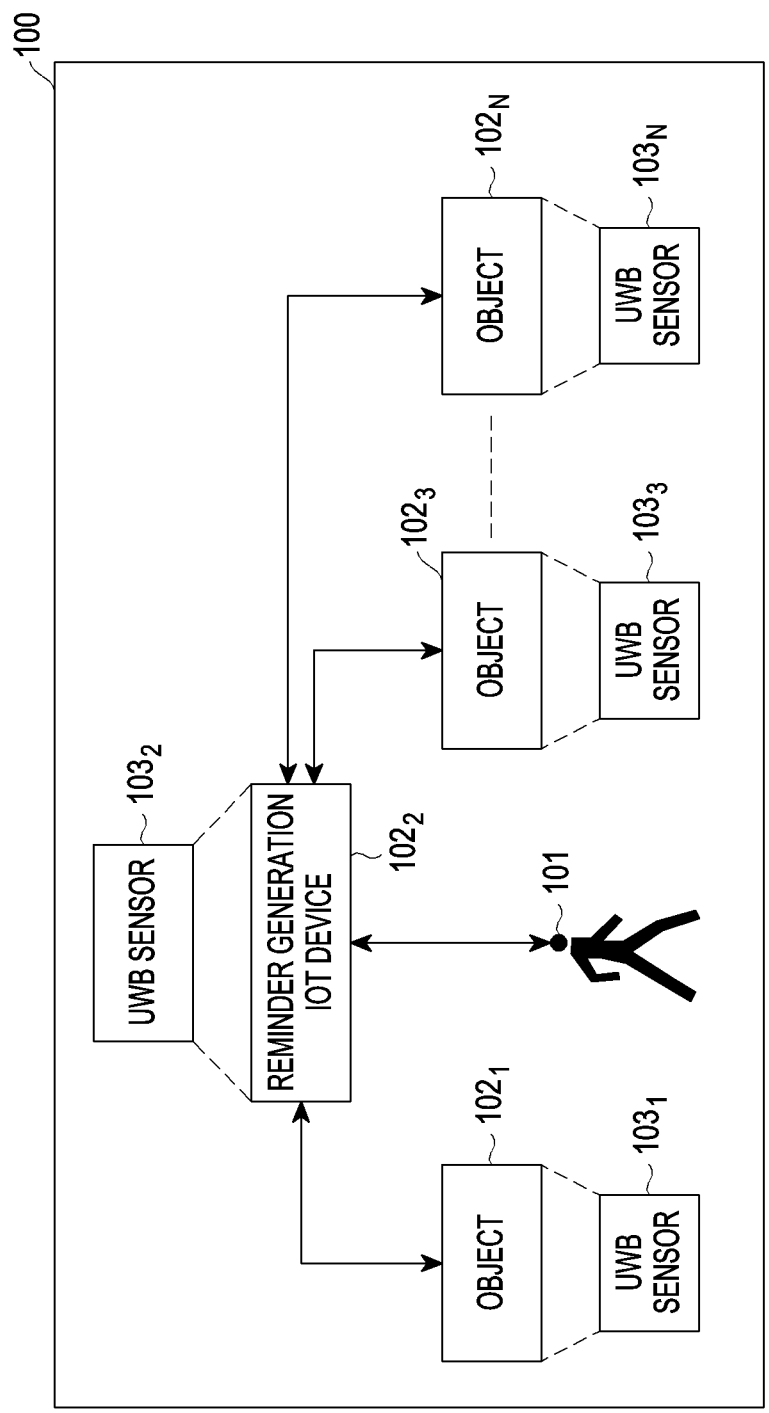
FIGS. 1A and 1B illustrate an environment for generating an activity reminder in an Internet of Things (IoT) environment according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the word "exemplary" is used herein to mean "serving as an example, instance, or illustration." Any embodiment or implementation of the subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the disclosure relate to a method and a reminder generation Internet of things (IoT) device for generating an activity reminder in an IoT environment. The IoT environment may comprise multiple objects. A user associated with the IoT environment may intend to perform an activity associated with an object. A movement of the user towards the object is identified. Further, an intended activity of the user, associated with the object is predicted. Consider that before performing the intended activity, the user may get interrupted. In such condition, an occurrence of one or more interrupts is determined. The user may either complete the interrupted activity or may leave it incomplete due to the occurrence of the one or more interrupts. In case the user moving away from the object subsequent to the occurrence of the one or more interrupts is detected, an activity reminder is generated to the user. The activity reminder is generated for performing the intended activity when the user does not move towards the object for a pre-determined time period. As a result, the disclosure aids in reminding the user to perform the intended activity in the IoT environment. Further, these reminders are dynamic in nature. The disclosure avoids the need of pre-logging the activities or manually setting the reminders. In addition, the disclosure considers IoT activities and non-IoT activities. Further, the disclosure considers interrupts caused by IoT events and non-IoT events.

FIG. 1A illustrates an environment for generating an activity reminder in an IoT environment according to an embodiment of the disclosure.

Referring to FIG. 1A, an environment 100 is an IoT environment 100. The IoT environment 100 comprises a user 101, an object ($102_1$, $102_2$, . . . $102_N$) (collectively referred as plurality of objects 102), an Ultra-wideband (UWB) sensor ($103_1$, $103_2$, . . . $103_N$) (collectively referred as one or more UWB sensors 103) corresponding to each of the plurality of objects 102. Any object in the plurality of objects 102 may be implemented for reminder generation. For instance, referring to FIG. 1A, the object $102_2$ is configured as the reminder generation IoT device $102_2$. For example, the object may be a TV. The plurality of objects may include IoT objects/devices or non-IoT objects. For example, in any smart home IoT environment, the IoT devices may include a smart television (TV), a speaker, a mobile phone, an oven, a refrigerator, and the like. The non-IoT objects may include a gas stove, an iron, a food processor, and the like. In another example, the IoT environment 100 may be a smart office. The IoT objects may include a laptop, an air conditioner (AC), a mobile phone, and the like. The non-IoT objects may include a comfortable chair, a file cabinet, and the like. The user 101 may use the plurality of objects 102 to perform activities in the IoT environment 100. For example, the object may be a TV. The user 101 may perform the activity of watching TV. In another example, the activity may be loading clothes in a washing machine and switching on the washing machine. The IOT environment 100 may comprise multiple users performing respective activities. FIG. 1A illustrates one user 101 for illustrative purposes only and should not be considered as limiting.

Figure 1B:
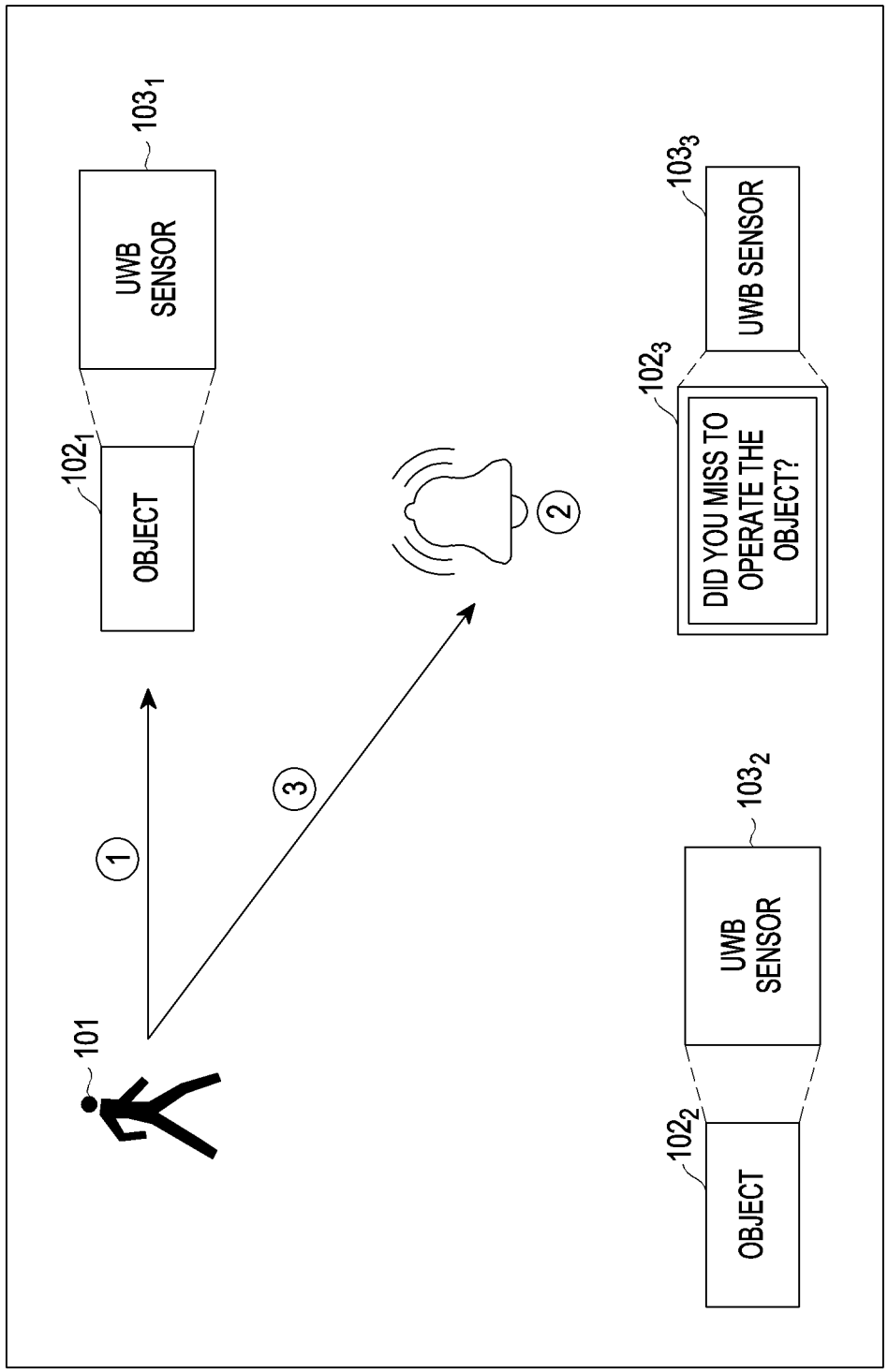

FIG. 1B illustrates an environment for generating an activity reminder in an IoT environment according to an embodiment of the disclosure.

Referring to FIG. 1B, at operation 1, the user 101 is moving towards the object $102_1$. Consider, the object $102_1$ may be an AC. The user 101 may be interrupted by a beeping sound from a refrigerator, indicating that door of the refrigerator is open. The user 101 may forget to operate the AC. In the disclosure, the reminder generation IoT device $102_2$ generates the activity reminder to the user 101, indicating to operate the AC. The reminder generation IoT device $102_2$ identifies a movement of the user 101 towards the object $102_1$ in the IoT environment 100. The movement of the user 101 may be identified based on data from the one or UWB sensors 103 in the IoT environment 100. The UWB is a short-range, wireless communication protocol that operates through radio waves and operates at very high frequencies. A UWB sensor can be used to capture highly accurate spatial and directional data. The UWB sensor can discover location of an object and communicate with the object. The one or more UWB sensors may be associated with a device associated with the user 101, the object 102₁, other objects from the plurality of objects 102, and the like. Further, the reminder generation IoT predicts a first intended activity of the user 101 associated with the object 102₁, based on one or more factors. For example, the first intended activity may be predicted as change settings of the AC. The user 101 may be interrupted before performing the first intended activity. The reminder generation IoT device 102₂ determines occurrence of one or more interrupts in the IoT environment 100 before performing the first intended activity associated with the object. For example, at operation 2, the user 101 is interrupted by ringing of a doorbell. The reminder generation IoT device 102₂ determines the occurrence of this interrupt. The user 101 may either complete the interrupted activity or may leave it incomplete due to the occurrence of the interrupt. The reminder generation IoT device 102₂ detects the movement of the user 101 away from the object 102₁ in case the user 101 moves away before performing the first intended activity. For example, at operation 3, the user 101 is moving away from the object 102₁. In such condition, the reminder generation IoT device 102₂ may determine whether the user 101 returns to the object 102₁ within a pre-determined time period. In case the user 101 does not return to the object 102₁ for the pre-determined time period, the reminder generation IoT device 102₂ may generate the activity reminder to the user 101, indicating to perform the first intended activity when the user 101 does not move towards the object 102₁ for the pre-determined time period. For example, the reminder generation IoT device 102₂ may generate the reminder after 15 secs when the user 101 does not move towards the AC. The reminder may be generated in form of a text, audio, and the like. For example, the reminder may be generated and displayed as a text in a smart screen 102₃.

Figure 2:
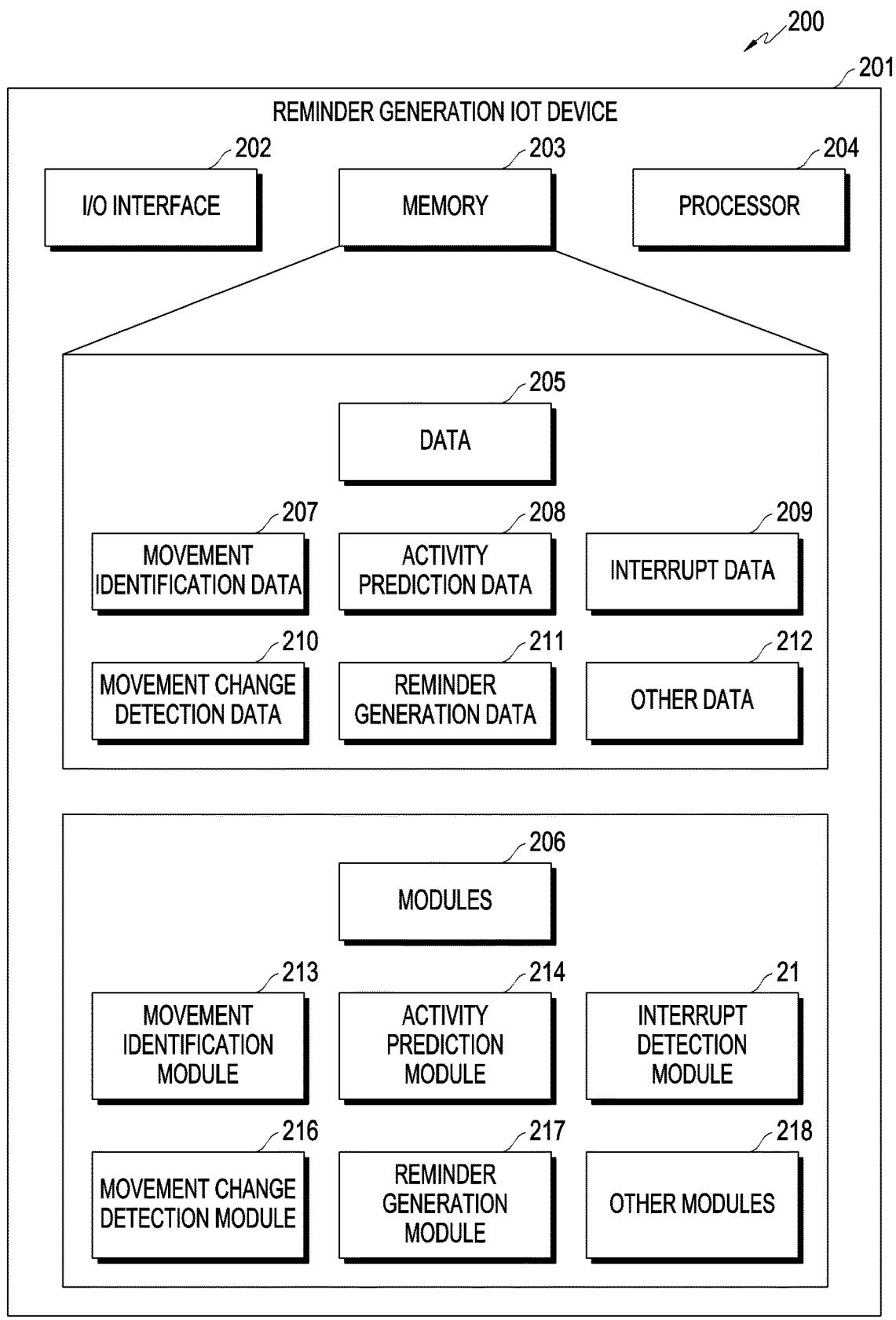
FIG. 2 illustrates a diagram of a reminder generation IoT device for generating an activity reminder in an IoT environment according to an embodiment of the disclosure.

FIG. 2 illustrates a diagram 200 of a reminder generation IoT device for generating an activity reminder in an IoT environment according to an embodiment of the disclosure.

Referring to FIG. 2, the reminder generation IoT device 102₂ is referred as the reminder generation IoT device 201 hereafter in the description. The reminder generation IoT device 201 may include central processing units 204 (also referred as "CPUs" or "one or more processors 204"), Input/Output (I/O) interface 202, and a memory 203. In some embodiments of the disclosure, the memory 203 may be communicatively coupled to the one or more processors 204. The memory 203 stores instructions executable by the one or more processors 204. The one or more processors 204 may comprise at least one data processor for executing program components for executing user or system-generated requests. The memory 203 may be communicatively coupled to the one or more processors 204. The memory 203 stores instructions, executable by the one or more processors 204, which, on execution, may cause the one or more processors 204 to generate the activity reminder in the IoT environment 100. In an embodiment of the disclosure, the memory 203 may include one or more modules 206 and data 205. The one or more modules 206 may be configured to perform the steps of the disclosure using the data 205, to generate the activity reminder in the IoT environment 100. In an embodiment of the disclosure, each of the one or more modules 206 may be a hardware unit which may be outside the memory 203 and coupled with the reminder generation IoT device 201. As used herein, the term modules 206 refers to an application specific integrated Circuit (ASIC), an electronic circuit, a field-programmable gate arrays (FPGA), programmable system-on-chip (PSoC), a combinational logic circuit, and/or other suitable components that provide described functionality. The one or more modules 206 when configured with the described functionality defined in the disclosure will result in a novel hardware. Further, the I/O interface 202 is coupled with the one or more processors 204 through which an input signal or/and an output signal is communicated. For example, the reminder generation IoT device 201 may transmit the generated reminder via the I/O interface 202 to the user 101. In an embodiment of the disclosure, the reminder generation IoT device 201 may be an IoT device of the IoT environment 100. For example, the reminder generation IoT device 201 may be a computer, TV, and the like. In another embodiment of the disclosure, the reminder generation IoT device 201 may be implemented in a variety of computing systems, such as a laptop computer, a desktop computer, a personal computer (PC), a notebook, a smartphone, a tablet, e-book readers, a server, a network server, a cloud-based server, and the like. In another embodiment of the disclosure, the reminder generation IoT device 201 may be remote to the IoT environment 100 and communicate with the plurality of objects 102, the user 101, and the like in the IoT environment 100 over a communication network. The reminder generation IoT device 201 may be implemented in a cloud environment.

In one implementation, the modules 206 may include, for example, a movement identification module 213, an activity prediction module 214, an interrupt detection module 215, a movement change detection module 216, a reminder generation module 217, and other modules 218. It will be appreciated that such aforementioned modules 206 may be represented as a single module or a combination of different modules. In one implementation, the data 205 may include, for example, movement identification data 207, activity prediction data 208, interrupt data 209, movement change detection data 210, reminder generation data 211, and other data 212.

In an embodiment of the disclosure, the movement identification module 213 may be configured to identify a movement of the user 101 towards the object 102₁ in the IoT environment 100. Firstly, the movement identification module 213 may be configured to detect the user 101. The user 101 may be detected using a UWB sensor associated with the user 101, the object 102₁, other objects from the plurality of objects 102, and the like. For example, the UWB sensor associated with the user 101 may transmit the radio signals. The radio signals may transmit a unique identification (ID) associated with the user 101. In another example, a radio signal may be transmitted from the object 102₁ towards the user 101. The radio signal reflected at the object 102₁ may be used to detect the user 101. A person skilled in the art will appreciate that any known methods other than the above-mentioned methods may be used to detect the user 101. Further, the movement identification module 213 may be configured to identify the movement of the user 101 towards the object 102₁ in the IoT environment 100. The object 102₁ may be an IoT device, such as, a smart TV or a non-IoT device, such as an iron. The movement of the user 101 towards the object 102₁ may be identified based on data from the one or more UWB sensors 103 in the IoT environment 100. The data from the one or more UWB sensors 103 may comprise a distance between the user 101 and the object 102₁, signal power associated with a signal reflected from a device associated with the user (101), the object, and the other objects, angle of arrival of the signal, time difference of arrival of the signal, and the like.

Figure 3A:
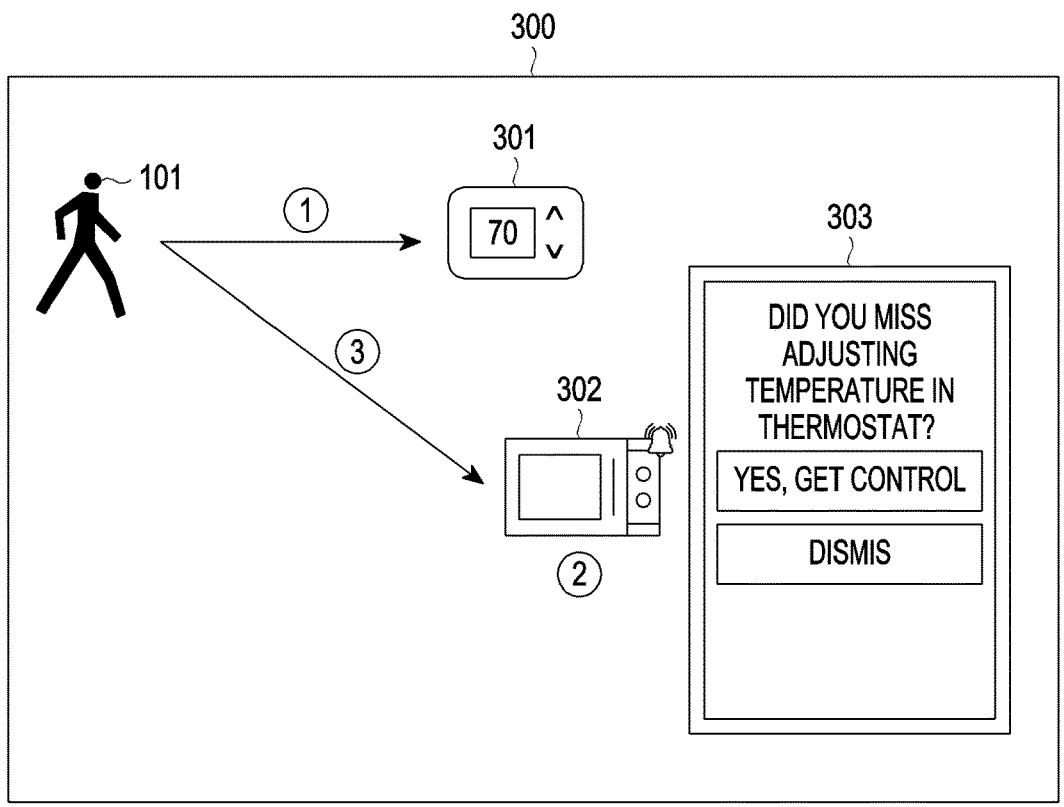
FIGS. 3A, 3B, and 3C show illustrations for generating an activity reminder in an IoT environment according to various embodiments of the disclosure.
Figure 3B:
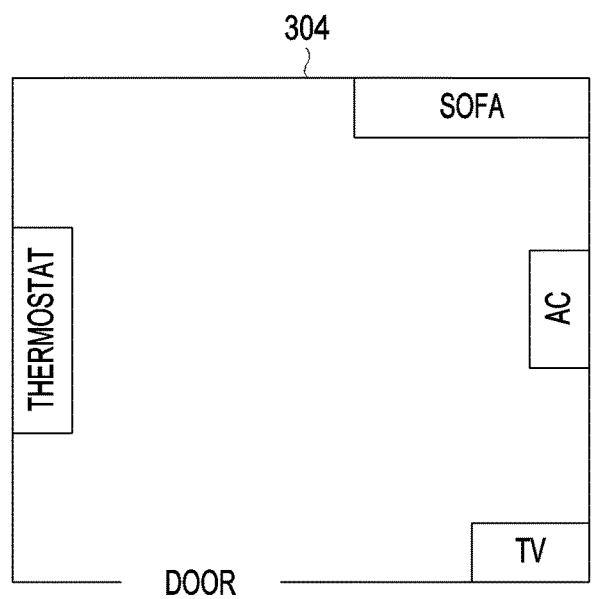
Figure 3C:
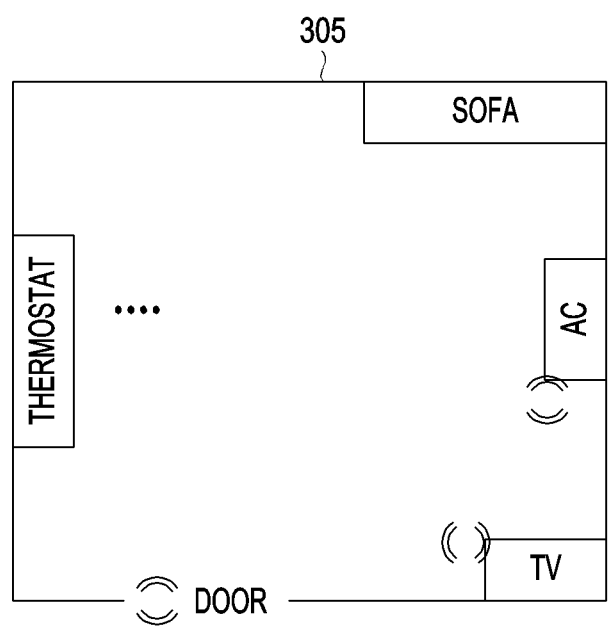

FIGS. 3A, 3B, and 3C show illustrations for generating an activity reminder in an IoT environment according to various embodiments of the disclosure.

Referring to example 300 of FIG. 3A, at operation 1, the user 101 is moving towards a thermostat 301. The thermostat may be associated with a UWB sensor. A signal may be transmitted from the UWB sensor towards the user 101. The signal reflected from the user 101 is associated with a signal power. In an embodiment of the disclosure, outliers and interference in the reflected signal may be normalized to avoid incorrect user movement identification. The signal power may increase when the user 101 is moving towards the thermostat 301. Further, the distance between the user 101 and the object $102_1$ may decrease continuously when the user 101 is moving towards the thermostat 301. Hence, the movement identification module 213 may identify the movement of the user 101 towards the thermostat 301 based on the data from the one or more UWB sensors 103.

In another embodiment of the disclosure, the movement identification module 213 may identify the movement of the user 101 based on an object map. The object map may indicate locations of the plurality of objects 102 in the IoT environment 100.

Referring to FIG. 3B, it shows an object map 304. The object map indicates locations of the plurality of objects 102 in the IOT environment 100, such as, sofa, thermostat, AC, TV, and the like. The object map may be dynamically updated at pre-defined time intervals since locations of the plurality of objects 102 may change in a period of time. The object map may be updated based on the data from the one or more UWB sensors 103, data from an image capturing unit, such as an IoT camera, and the like. In an example, the thermostat 301 may not be associated with an UWB sensor.

Referring to FIG. 3C, a movement identification module 213 may receive the data from a UWB sensor associated with an AC as shown in FIG. 3C. A signal received from the UWB sensor associated with the AC may have a low signal power and the distance between the AC and the user 101 may be increasing. Further, the data from UWB sensors associated with other objects, such as TV, smart doorbell, and the like may also be received. The data from multiple objects may be consolidated. The movement identification module 213 may identity the movement of the user 101 towards the thermostat 301 based on an object map 305 and consolidated data from the multiple objects. Further, data related to identification of the movement of the user 101, the object map 305 and consolidated data may be provided to a neural network. For example, the neural network may be a deep Learning Long Short-Term Memory (LSTM) network. The neural network may predict the user movement towards the $102_1$. The movement identification module 213 may receive data related to the prediction from the neural network and may identify the movement of the user 101. The data related to the identification of the movement and the object map 305 may be stored as the movement identification data 207 in the memory 203.

In an embodiment of the disclosure, the activity prediction module 214 may be configured to receive the movement identification data 207 from the movement identification module 213. The activity prediction module 214 may be configured to predict the first intended activity of the user 101, associated with the object $102_1$ in the IoT environment 100. The first intended activity may be predicted by an activity prediction model based on one or more factors. The activity prediction model may be associated with the activity prediction module 214. The activity prediction model may be the neural network (stated in paragraph 24) or any other neural network. For example, the activity prediction model may be reinforcement learning (RL) based deep learning model. A person skilled in the art will appreciate that any known neural networks other than the above-mentioned neural networks may be used to predict the first intended activity of the user 101, based on the one or more factors. The one or more factors may comprise past interactions of the user 101 with the object $102_1$, a current state of the object $102_1$, and the like. The activity prediction model may learn user activity patterns over-time based on the past interactions of the user 101. For example, the activity prediction model may predict the user is controlling AC temperature, when the movement of the user 101 towards the AC is identified. The activity prediction model may predict the first intended activity based on the current state of the object $102_1$. For example, the AC may be in a switched-on state when the user 101 wakes up. The user may move towards the AC. The activity prediction model may predict the first intended activity, based on interactions of the user 101 as switching off the AC. Referring again to the example 300 of FIG. 3A, the activity prediction module 214 may predict the first intended activity as adjusting the temperature in the thermostat 301. The predicted first intended activity may be stored as the activity prediction data 208 in the memory 203.

In an embodiment of the disclosure, the interrupt detection module 215 may be configured to receive the activity prediction data 208 from the activity prediction module 214. The interrupt detection module 215 may be configured to determine an occurrence of the one or more interrupts in the IoT environment 100 before performing the first intended activity associated with the object. Each of the one or more interrupts may be caused by the IoT event or the non-IoT event. The interrupt detection module 215 may determine the occurrence of the one or more interrupts based on two conditions. Firstly, the interrupt detection module 215 may determine the occurrence of the interrupt based on one or more parameters associated with the plurality of objects 102 in the IoT environment 100. The one or more parameters may include, but not limited to, a state parameter, an audio parameter, a video parameter, and the like. For example, the state of a smart doorbell may change from an OFF state to an ON state when a person is at a door in a smart home. The ringing of the smart doorbell may cause an interrupt when the user 101 is intending to perform the first intended activity of switching off the TV. This interrupt is caused by the IoT event, since the interrupt is caused by the smart doorbell which is an IoT device. Secondly, the interrupt detection module 215 may determine a change in direction of the user 101 away from the object $102_1$ before performing the first intended activity. When the two conditions are satisfied, the interrupt detection module 215 determines the occurrence of the one or more interrupts. In the above stated example, the user 101 may move away from the TV and attend to the person. The interrupt detection module 215 may determine the occurrence of the one or more interrupts based on the state of the smart doorbell and the change in direction of the user 101 away from the TV. In another embodiment of the disclosure, consider that the user 101 may not immediately attend to the person. Instead, the user 101 may switch off the TV and then attend to the person. The interrupt detection module 215 may determine that the change in direction of the user 101 is not sudden and reaction time is more than a pre-defined value (for example, 5 seconds). In such case, the interrupt detection module 215 may determine that the IoT event is not an interrupt. In another example, a glass cup may fall from a table and break. A speaker nearby the table may capture sound from breaking of the glass cup. The breaking of the glass cup may cause an interrupt when the user 101 is intending to perform the first intended activity. The interrupt detection module 215 may determine a change in direction of the user 101. The interrupt detection module 215 may determine the occurrence of the interrupt based on the audio parameter associated with the breaking of the glass cup and change in direction of the user 101. This interrupt is caused by the non-IoT event. Referring again to the example 300 of FIG. 3A, at operation 2, a microwave oven 302 may provide a notification that food is heated. The interrupt detection module 215 may determine the occurrence of the interrupt based on a completion state associated with the microwave oven 302 and the change in direction of the user 101. In an example, the first intended activity of the user 101 may be switching off the TV. A first interrupt may be caused by breaking of the glass cup. A second interrupt mat be caused by crying of a kid. The first interrupt and the second interrupt may occur simultaneously. The interrupt detection module 215 may determine the audio parameter associated with the breaking of the glass cup and crying of the kid. Further, the interrupt detection module 215 may determine the occurrence of the one or more interrupts based on the change in direction of the user 101. In another example, a first interrupt may be a notification from a washing machine indicating that washing of clothes is completed. A second interrupt may be ringing of the smart doorbell. The interrupt detection module 215 may determine the state of the washing machine and the smart doorbell to determine the occurrence of the one or more interrupts. Consider that the user 101 may not move towards the washing machine immediately to switch off the washing machine, rather the user 101 may move towards the door to attend to the person at the door. The interrupt detection module 215 may determine the change in direction of the user 101 and determine the occurrence of the interrupt i.e., the second interrupt. The data related to determination of the occurrence of the one or more interrupts may be stored as the interrupt data 209 in the memory 203.

In an embodiment of the disclosure, the movement change detection module 216 may receive the interrupt data 209 from the interrupt detection module 215. The movement change detection module 216 may be configured to detect the movement of the user 101 away from the object 102$_1$ subsequent to the occurrence of the one or more interrupts and before performing the first intended activity. The movement of the user 101 away from the object 102$_1$ may be detected using data from the one or more UWB sensors 103 in the IOT environment 100. Referring to the example 300 of FIG. 3A, the user 101 moving away from the thermostat 301 may be determined based on the data from the UWB sensor associated with the thermostat 301. The data from the UWB sensor may comprise the distance from the thermostat 301 and the user 101, the signal power associated with the signal reflected from the user 101, and the like. When the user 101 is moving away from the thermostat, the distance from the thermostat 301 and the user 101 may continuously increase and the signal power may continually decrease. Further, the movement of the user 101 away from the object 102$_1$ before performing the first intended activity is determined by predicting that the user 101 has not completed the first intended activity. The prediction may be performed by the neural network. The prediction may be based on a distance between the user 101 and the object, time spent by the user 101 near the object 102$_1$ before moving away from the object, a current state of the object 102$_1$, and data related to completion of the first intended activity obtained from one or more sources. Referring again to the example 300 of FIG. 3A, the neural network may predict that the user 101 has not operated the thermostat 301 based on determining that the state of the thermostat or settings on the thermostat are unchanged. Further, the neural network may predict that the user 101 has moved away from the thermostat 301 when the distance between the thermostat 301 and the user 101 was large i.e., the user 101 had not reached the thermostat 301. In another example, the user 101 may be moving near a laundry bag to load clothes in a washing machine. The user 101 may be interrupted and move away from the laundry bag. The neural network may predict that the user 101 spent less time near the laundry bag (for example, 1 or 2 seconds) and moved away from the laundry bag. Further, the neural network may obtain the data related to completion of the first intended activity from the one or more sources, such as, IoT camera, a robot camera installed on a vacuum cleaner, and the like. The neural network may determine that the laundry bag is full, and the clothes are not loaded to the washing machine based on an image or a video from the one or more sources. The data related to the movement change may be stored as the movement change detection data 210 in the memory 203.

In an embodiment of the disclosure, the reminder generation module 217 may be configured to receive the movement change detection data 210 from the movement change detection module 216. The reminder generation module 217 may be configured to generate the activity reminder to the user 101, indicating to perform the first intended activity when the user 101 does not move towards the object 102$_1$ for the pre-determined time period. In an embodiment of the disclosure, the pre-determined time period may be 10 secs The reminder generation module 217 may monitor the movement of the user 101 after receiving the movement change detection data 210. The reminder generation module 217 may monitor the movement based on the data from the one or more UWB sensors 103. The reminder generation module 217 may determine that the user 101 has not moved towards the object 102$_1$ for the pre-determined time period. Further, the reminder generation module 217 may determine whether the first intended activity is completed based on data related to the prediction in the movement change detection data 210. The reminder generation module 217 may generate the activity reminder to the user 101, indicating to perform the first intended activity. The reminder generation module 217 may generate the activity reminder to the user 101 on a nearby object to the user 101. The nearby object may be identified based on at least one of data from the one or more UWB sensors 103 and an object map. The nearby object may be an IoT device. The reminder generation module 217 may identify the nearby object further based on one or more capabilities of the nearby object. The one or more capabilities of the nearby object may comprise audio capability, display capability, and the like. Referring to the example 300 in FIG. 3A, the reminder generation module 217 may determine that the user 101 has not moved towards the thermostat 301 for the pre-determined time period. Thereafter, the reminder generation module 217 may determine nearby objects for example, a refrigerator 303 and food processor (not shown in FIG. 3A) based on the data from the UWB sensor associated with the refrigerator 303 and the food processor or from the object map. Further, the reminder generation module 217 may determine a capability of the refrigerator 303 and food processor. The reminder generation module 217 may determine that the refrigerator 303 comprises display capability. Accordingly, the reminder generation module 217 may display the activity reminder on a screen associated with the refrigerator 303. The activity reminder may be in form of a text, audio, and the like. FIG. 3A shows the activity reminder displayed as a text "Did you miss adjusting temperature I thermostat?". Further, the reminder generation module 217 may display options, such as "Yes, get control", "dismiss", and the like. The generated activity reminder may be stored as the reminder generation data 211 in the memory 203. For example, the reminder generation data 211 may maintain a list of generated activity reminders and pre-defined activity reminders provided by the user 101 which may be used by the reminder generation module 217 to generate the activity reminder.

The other data 205 may store data, including temporary data and temporary files, generated by the one or more modules 206 for performing the various functions of the reminder generation IoT device 201. The one or more modules 206 may also include the other modules 206 to perform various miscellaneous functionalities of the reminder generation IoT device 201. The other data 205 may be stored in the memory 203. It will be appreciated that the one or more modules 206 may be represented as a single module or a combination of different modules.

Figure 4:
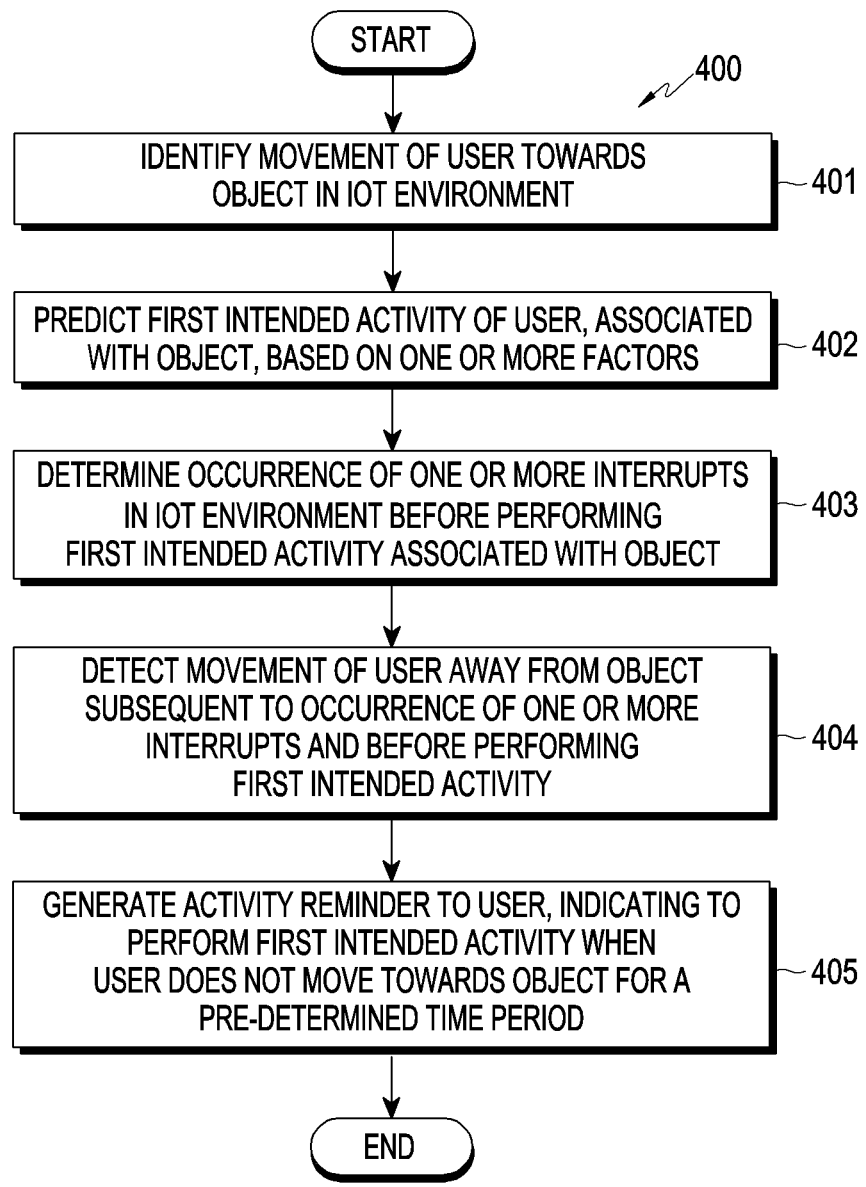
FIG. 4 illustrates a flow chart illustrating method steps for generating an activity reminder in an IoT environment according to an embodiment of the disclosure.

FIG. 4 illustrates a flowchart illustrating method steps for generating an activity reminder in an IoT environment according to an embodiment of the disclosure.

Referring to FIG. 4, a method 400 may comprise one or more steps. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Figure 5:
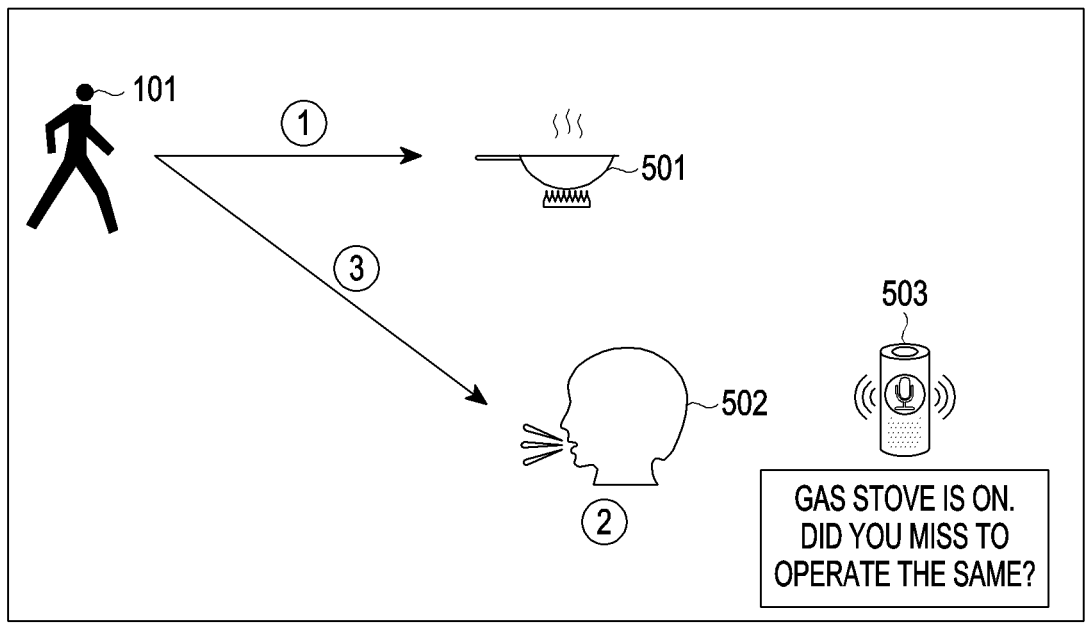
FIGS. 5 and 6 show illustrations for generating an activity reminder in an IoT environment according to various embodiments of the disclosure.
Figure 6:
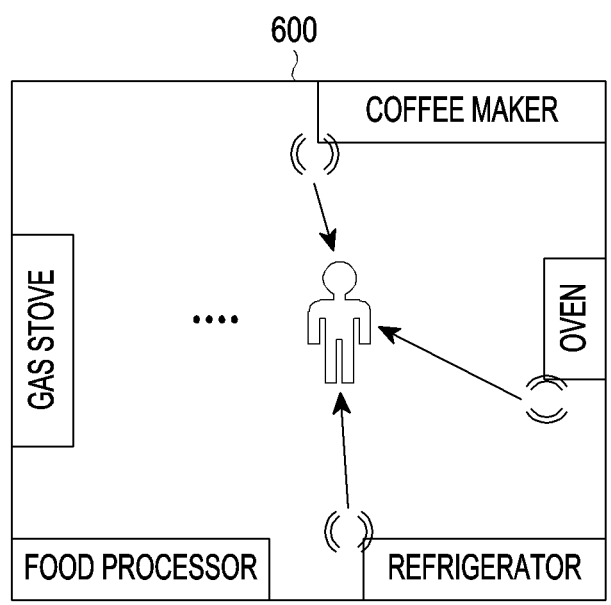

FIGS. 5 and 6 show illustrations for generating an activity reminder in an IoT environment according to various embodiments of the disclosure.

Referring to FIGS. 5 and 6, at operation 401, the reminder generation IoT device 201 identifies the movement of the user 101 towards the object $102_1$ in the IoT environment 100. The reminder generation IoT device 201 may be configured to detect the user 101, based on the data from the one or more UWB sensors 103. Further, the reminder generation IoT device 201 may identify the movement of the user 101 towards the object $102_1$ in the IoT environment 100. The movement of the user 101 towards the object $102_1$ may be identified based on data from the one or more UWB sensors 103 in the IoT environment 100. The reminder generation IoT device 201 may identify the movement of the user 101 further based on the object map. Further, data related to identification of the movement of the user 101, the object map 304 and the data from the one or more UWB sensors 103 may be provided to the neural network. Referring to example 500 of FIG. 5, at operation 1, the user 101 is moving towards a gas stove 501. The gas stove 501 and the user 101 may not be associated with a UWB sensor. The reminder generation IoT device 201 may identify the movement of the user 101 towards the gas stove 501 based on the data from the one or more UWB sensors 103 associated with other objects among the plurality of objects 102 and the object map. Referring to FIG. 6, an object map 600 associated with a kitchen in the smart home is illustrated. The object map shows locations of the plurality of objects 102, such as, the gas stove 501, food processor, refrigerator, oven, smart coffee maker, and the like. The smart coffee maker, the oven, and the refrigerator may be associated with the one or more UWB sensors 103. The data from a UWB sensor associated with the oven may indicate that the user 101 is moving away from the oven. Similarly, the data from UWB sensors associated with the smart coffee maker and the refrigerator may indicate that the user 101 is moving away from the smart coffee maker and the refrigerator. Further, the user 101 may be moving towards the gas stove 501 or the food processor. The data from the UWB sensor associated with the refrigerator may indicate that the user 101 is not moving towards the food processor. The reminder generation IoT device 201 may identify that the user 101 is moving towards the gas stove 501 based on the data from the one or more UWB sensors 103 and the object map.

Referring back to FIG. 4, at operation 402, the reminder generation IoT device 201 predicts the first intended activity of the user 101, associated with the object $102_1$ in the IoT environment 100, based on one or more factors. The reminder generation IoT device 201 may be configured to predict the first intended activity of the user 101, associated with the object $102_1$ in the IoT environment 100. The first intended activity may be predicted by the activity prediction model based on the one or more factors. The activity prediction model may be associated with the reminder generation IoT device 201. The one or more factors may comprise past interactions of the user 101 with the object $102_1$, a current state of the object $102_1$, and the like. Referring again to the example 500 of FIG. 5, the reminder generation IoT device 201 may receive an image from an IoT camera. The reminder generation IoT device 201 may determine the as gas stove 501 is ON from the image. The reminder generation IoT device 201 determine that the first intended activity is switching off the gas stove 501 based on the past interactions of the user 101.

At operation 403, the reminder generation IoT device 201 may be configured to determine an occurrence of the one or more interrupts in the IoT environment 100 before performing the first intended activity associated with the object. The reminder generation IoT device 201 may determine the occurrence of the one or more interrupts based on the one or more parameters associated with the plurality of objects 102 in the IoT environment 100. Further, the reminder generation IoT device 201 may determine the occurrence of the one or more interrupts based on the change in direction of the user 101 away from the object $102_1$ before performing the first intended activity. When the two conditions are satisfied, the reminder generation IoT device 201 determines the occurrence of the one or more interrupts. Referring again to the example 500 of FIG. 5, a kid 502 may call his mother (the user 101). A smart speaker 503 near the kid may capture the sound and transmit an output proportional to the sound to the reminder generation IoT device 201. The reminder generation IoT device 201 may determine the change in direction of the user 101. The reminder generation IoT device 201 may determine the occurrence of the one or more interrupts based on the output from the speaker and the change in direction of the user 101.

Referring back to FIG. 4, at operation 404, the reminder generation IoT device 201 may be configured to detecting the movement of the user 101 away from the object $102_1$ subsequent to the occurrence of the one or more interrupts and before performing the first intended activity. The movement of the user 101 away from the object $102_1$ may be detected using the data from the one or more UWB sensors 103 in the IOT environment 100. Further, the movement of the user 101 away from the object $102_1$ before performing the first intended activity is determined by predicting that the user 101 has not completed the first intended activity. The prediction may be performed by the neural network. The prediction may be based on a distance between the user 101 and the object, time spent by the user 101 near the object $102_1$ before moving away from the object, a current state of the object $102_1$, and data related to completion of the first intended activity obtained from one or more sources. Referring again to the example 500 of FIG. 5, the reminder generation IoT device 201 may determine the movement of the user 101 away from the gas stove 501 based on the data from the one or more UWB sensors associated with the other objects. Further, the neural network may predict that the user 101 has moved away from the gas stove 501 when the distance between the gas stove 501 and the user 101 was large i.e., the user 101 had not reached the gas stove 501. Further, the neural network may determine that the gas stove is in ON state, based on an image or a video from the one or more sources.

Referring back to FIG. 4, at operation 405, the reminder generation IoT device 201 may generate the activity reminder to the user 101, indicating to perform the first intended activity when the user 101 does not move towards the object $102_1$ for the pre-determined time period. The reminder generation IoT device 201 may monitor the movement of the user 101 for the pre-determined time period. The reminder generation IoT device 201 may determine that the user 101 has not moved towards the object $102_1$ for the pre-determined time period. Further, the reminder generation IoT device 201 may determine whether the first intended activity is completed based on the data related to the prediction of completion of the first intended activity. The reminder generation IoT device 201 may generate the activity reminder to the user 101, indicating to perform the first intended activity. The reminder generation IoT device 201 may generate the activity reminder to the user 101 on the nearby object to the user 101. The nearby object may be identified based on at least one of data from the one or more UWB sensors 103 and the object map. The reminder generation IoT device 201 may identify the nearby object further based on one or more capabilities of the nearby object. Referring to the example 500 in FIG. 5, the reminder generation IoT device 201 may determine that the user 101 has not moved towards the gas stove 501 for the pre-determined time period. The reminder generation IoT device 201 may determine the nearby object as the smart speaker 503. The reminder generation IoT device 201 may determine that the smart speaker 503 has the audio capability. The smart speaker 503 may transmit the audio of the activity reminder as "Gas stove is on. Did you miss to operate the same?".

Computer System

Figure 7:
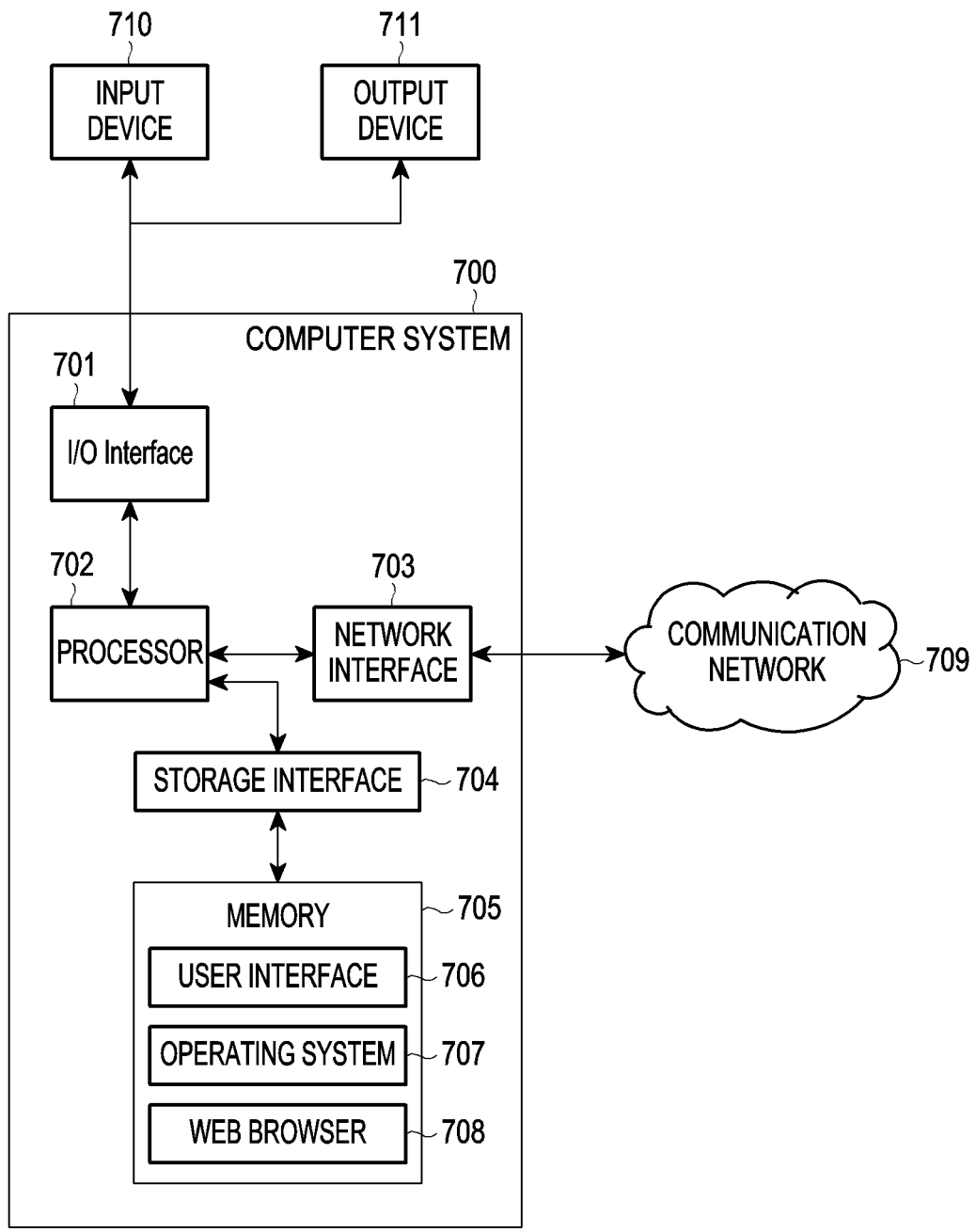
FIG. 7 illustrate a block diagram of a general-purpose computing system for generating an activity reminder in an IoT environment according to an embodiment of the disclosure.

FIG. 7 illustrates a block diagram of a computer system according to an embodiment of the disclosure.

Referring to FIG. 7, in an embodiment of the disclosure, the computer system 700 may be the reminder generation IoT device 201. Thus, the computer system 700 may be used to generate the activity reminder in the IoT environment 100. The computer system 700 may comprise a central processing unit 702 (also referred as "CPU" or "processor"). The processor 702 may comprise at least one data processor.

The processor 702 may include specialized processing units, such as integrated system (bus) controllers, memory management control units, floating point units, graphics processing units, digital signal processing units, or the like.

The processor 702 may be disposed in communication with one or more input/output (I/O) devices (not shown) via an I/O interface 701. The I/O interface 701 may employ communication protocols/methods, such as, without limitation, audio, analog, digital, monoaural, RCA, stereo, institute of electrical and electronics engineers (IEEE)-1394, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), worldwide interoperability for microwave access (WiMax), or the like), or the like.

Using the I/O interface 701, the computer system 700 may communicate with one or more I/O devices. For example, an input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, or the like. An output device 711 may be a printer, fax machine, video display (e.g., cathode ray tube (CRT), liquid crystal display (LCD), light-emitting diode (LED), plasma, plasma display panel (PDP), organic light-emitting diode display (OLED) or the like), audio speaker, or the like.

The computer system 700 may communicate with the one or more receivers 712 through a communication network 709. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, or the like. The communication network 709 may include, without limitation, a direct interconnection, local area network (LAN), wide area network (WAN), wireless network (e.g., using wireless application protocol), the Internet, or the like. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, or the like.

The communication network 709 includes, but is not limited to, a direct interconnection, an e-commerce network, a peer to peer (P2P) network, local area network (LAN), wide area network (WAN), wireless network (e.g., using wireless application protocol), the Internet, Wi-Fi, and such. The first network and the second network may either be a dedicated network or a shared network, which represents an association of the different types of networks that use a variety of protocols, for example, hypertext transfer protocol (HTTP), transmission control protocol/Internet protocol (TCP/IP), wireless application protocol (WAP), or the like, to communicate with each other. Further, the first network and the second network may include a variety of network devices, including routers, bridges, servers, computing devices, storage devices, or the like.

In some embodiments of the disclosure, the processor 702 may be disposed in communication with a memory 705 (e.g., a random access memory (RAM), a read-only memory (ROM), or the like not shown in FIG. 7) via a storage interface 704. The storage interface 704 may connect to the memory 705 including, without limitation, memory drives, removable disc drives, or the like, employing connection protocols, such as serial advanced technology attachment (SATA), integrated drive electronics (IDE), IEEE-1394, a universal serial bus (USB), fiber channel, small computer systems interface (SCSI), or the like. The memory drives may further include a drum, magnetic disc drive, magneto-optical drive, optical drive, redundant array of independent discs (RAID), solid-state memory devices, solid-state drives, or the like.

The memory 705 may store a collection of program or database components, including, without limitation, a user interface 706, an operating system 707, a web browser 708, or the like. In some embodiments of the disclosure, computer system 700 may store user/application data, such as, the data, variables, records, or the like, as described in this disclosure. Such databases may be implemented as fault-tolerant, relational, scalable, secure databases, such as Oracle® or Sybase®.

The operating system 707 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION' (BSD), FREEBSD™, NETBSD™, OPENBSD™, or the like), LINUX DISTRIBUTIONS™ (E.G., RED HAT™, UBUNTU™, KUBUNTU™, or the like), IBM™ OS/2, MICROSOFT™ WINDOWS™ (XP™, VISTA™/7/8, 10, or the like), APPLE® IOS™, GOOGLE® ANDROID™, BLACKBERRY® OS, or the like.

In some embodiments of the disclosure, the computer system 700 may implement the web browser 708 stored program component. The web browser 708 may be a hypertext viewing application, for example MICROSOFT® INTERNET EXPLORER™, GOOGLE® CHROME™, MOZILLA® FIREFOX™, APPLE® SAFARI™, or the like. Secure web browsing may be provided using Secure hypertext transport protocol (HTTPS), secure sockets layer (SSL), transport layer security (TLS), or the like. Web browsers 708 may utilize facilities, such as AJAX™, DHTML™, ADOBE® FLASH™, JAVASCRIPT™, JAVA™, application programming interfaces (APIs), or the like. In some embodiments of the disclosure, the computer system 700 may implement a mail server (not shown in Figure) stored program component. The mail server may be an Internet mail server, such as Microsoft exchange, or the like. The mail server may utilize facilities, such as ASP™, ACTIVEX™, ANSI™ C++/C#, MICROSOFT®, NET™, CGI SCRIPTS™, JAVA™, JAVASCRIPT™, PERL™, PHP™ PYTHON™, WEBOBJECTS™, or the like. The mail server may utilize communication protocols, such as Internet message access protocol (IMAP), a messaging application programming interface (MAPI), MICROSOFT® exchange, post office protocol (POP), simple mail transfer protocol (SMTP), or the like. In some embodiments of the disclosure, the computer system 700 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, or the like.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include a random access memory (RAM), a read-only memory (ROM), a volatile memory, a non-volatile memory, hard drives, a compact disc read-only memory (CD ROMs), digital video disc (DVDs), flash drives, disks, and any other known physical storage media.

Embodiments of the disclosure provides methods to select the messaging service by considering limitations of the session-based messaging service and the non-session-based messaging service. Further, various parameters related to the sender, the one or more receivers, the trigger message, and the communication network are considered for selecting the messaging service. Hence, appropriate messaging service is selected for communication the one or more messages between the sender and the one or more receivers.

Further, the limitations of the session-based messaging service, such as the network traffic, latency, and overhead are avoided by selecting the non-session-based messaging service based on the parameters. Hence, network is efficiently utilized.

Further, sessions are established only when there is requirement. Hence, network resources are effectively utilized. The disclosure establishes session prior to the initiation of a message from the sender, based on usage pattern. Hence, the latency in establishing the session is reduced. Further, user experience is also improved.

The disclosure provides methods that reminds the user to perform the intended activity in the IoT environment. Further, these reminders are dynamic in nature. The disclosure avoids the need of pre-logging the activities or manually setting the reminders. In addition, the disclosure considers IoT activities and non-IoT activities. Further, the disclosure considers interrupts caused by IoT events and non-IoT events.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIG. 4 shows certain events occurring in a certain order. In alternative embodiments of the disclosure, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generating an activity reminder by an electronic device in an Internet of things (IOT) environment, the method comprising:
    identifying a movement of a user towards an object in the IoT environment;
    predicting a first future intended activity of the user, associated with the object, based on identifying the movement of the user towards the object, past interactions of the user with the object and a current state of the object associated with the first future intended activity of the user in the IoT environment, wherein the current state of the object comprises a switched-on state;
    determining an occurrence of one or more interrupts in the IoT environment based on a video parameter associated with at least one of a plurality of objects in the IoT environment, before beginning to perform the predicted first future intended activity associated with the object, wherein the one or more interrupts are an event external to the electronic device that prevents the user from performing the first future intended activity;
    detecting the movement of the user away from the object subsequent to the occurrence of the one or more interrupts and before beginning to perform the first future intended activity; and
    generating an activity reminder to the user, indicating to perform the first future intended activity when the user does not move towards the object for a pre-determined time period, after the detecting of the movement of the user away from the object,
    wherein the activity reminder is generated on a nearby object to the user, identified based on data from one or more ultra-wideband (UWB) sensors in the IoT environment.

2. The method of claim 1, wherein the movement of the user towards the object is identified based on data from the one or more (UWB) sensors in the IoT environment.

3. The method of claim 2, wherein the one or more UWB sensors are associated with at least one of a device associated with the user, the object among a plurality of objects in the IoT environment, or other objects from the plurality of objects.

4. The method of claim 2, wherein the data from the one or more UWB sensors comprise at least one of distance between the user and the object, signal power associated with a signal reflected from one of a device associated with the user, the object, and other objects from a plurality of objects, angle of arrival of the signal, or time difference of arrival of the signal.

5. The method of claim 2,
    wherein the identifying of the movement of the user is further based on an object map indicating locations of a plurality of objects in the IoT environment, and
    wherein the object map is dynamically updated at predefined time intervals.

6. The method of claim 2,
    wherein the movement of the user away from the object is detected using data from the one or more UWB sensors in the IoT environment, and
    wherein movement of the user away from the object before beginning to perform the first future intended activity is determined by:
        predicting that the user has not completed the first future intended activity, based on at least one of a distance between the user and the object, time spent by the user near the object before moving away from the object, the current state of the object, or data related to completion of the first intended activity obtained from one or more sources.

7. The method of claim 2,
    wherein the nearby object is an IoT device.

8. The method of claim 7, wherein the identifying of the nearby object is further based on one or more capabilities of the nearby object.

9. The method of claim 1,
    wherein the first future intended activity associated with the object is predicted by an activity prediction model based on one or more factors, and
    wherein the one or more factors comprise the current state of the object.

10. The method of claim 1,
    wherein the occurrence of the one or more interrupts is determined further based on a state parameter associated with the plurality of objects in the IoT environment.

11. An electronic device for generating an activity reminder in an Internet of things (IOT) environment, the electronic device comprising:
    one or more processors; and
    a memory,
    wherein the memory stores processor-executable instructions, which, when executed by the one or more processors, cause the electronic device to:
        identify a movement of a user towards an object in the IoT environment,
        predict a first future intended activity of the user, associated with the object, based on the movement of the user towards the object being identified, past interactions of the user with the object, and a current state of the object associated with the first future intended activity of the user in the IoT environment, wherein the current state of the object comprises a switched-on state, determine an occurrence of one or more interrupts in the IoT environment based on a video parameter associated with at least one of a plurality of objects in the IoT environment, before beginning to perform the predicted first future intended activity associated with the object, wherein the one or more interrupts are an event external to the electronic device that prevents the user from performing the first future intended activity, detect the movement of the user away from the object subsequent to the occurrence of the one or more interrupts and before beginning to perform the first future intended activity, and generate an activity reminder to the user, indicating to perform the first future intended activity when the user does not move towards the object for a pre-determined time period, after the movement of the user away from the object is detected, wherein the activity reminder is generated on a nearby object to the user, identified based on data from one or more ultra-wideband (UWB) sensors in the IoT environment.

12. The electronic device of claim 11, wherein the instructions, when executed by the one or more processors, cause the electronic device to identify movement of the user towards the object based on data from the UWB sensors in the IoT environment.

13. The electronic device of claim 12, wherein the one or more UWB sensors are associated with at least one of a device associated with the user, the object among a plurality of objects in the IoT environment, or other objects from the plurality of objects.

14. The electronic device of claim 12, wherein the data from the one or more UWB sensors comprise at least one of distance between the user and the object, signal power associated with a signal reflected from one of a device associated with the user, the object, and other objects from a plurality of objects, angle of arrival of the signal, or time difference of arrival of the signal.

15. The electronic device of claim 12,
wherein the instructions, when executed by the one or more processors, cause the electronic device further to identify the movement of the user further based on an object map indicating locations of a plurality of objects in the IoT environment, and
wherein the object map is dynamically updated at predefined time intervals.

16. The electronic device of claim 12,
wherein the instructions, when executed by the one or more processors, cause the electronic device further to detect the movement of the user away from the object using data from the one or more UWB sensors in the IOT environment, and
wherein the instructions, when executed by the one or more processors, cause the electronic device further to determine the movement of the user away from the object before beginning to perform the first future intended activity by:
predicting that the user has not completed the first future intended activity, based on at least one of a distance between the user and the object, time spent by the user near the object before moving away from the object, the current state of the object, and data related to completion of the first future intended activity obtained from one or more sources.

17. The electronic device of claim 12,
wherein the nearby object is an IoT device.

18. The electronic device of claim 17, wherein the instructions, when executed by the one or more processors, cause the electronic device further to identify the nearby object based on one or more capabilities of the nearby object.

19. The electronic device of claim 11,
wherein the first future intended activity associated with the object is predicted by an activity prediction model based on one or more factors, and
wherein the one or more factors comprise the current state of the object.

20. The electronic device of claim 11,
wherein the instructions, when executed by the one or more processors, cause the electronic device to determine the occurrence of the one or more interrupts further based on:
a state parameter associated with the plurality of objects in the IoT environment.

* * * * *